(12) United States Patent
Inoue et al.

(10) Patent No.: US 6,440,604 B1
(45) Date of Patent: *Aug. 27, 2002

(54) CELL

(75) Inventors: Takefumi Inoue; Hiroaki Yoshida, both of Kyoto (JP)

(73) Assignee: Japan Storage Battery Co., Ltd., Kyoto (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,364

(22) Filed: Sep. 8, 1999

(30) Foreign Application Priority Data

| Sep. 8, 1998 | (JP) | 10-253390 |
| Sep. 8, 1998 | (JP) | 10-253391 |
| Nov. 24, 1998 | (JP) | 10-350692 |

(51) Int. Cl.⁷ .................. H01M 4/02; H01M 2/26; H01M 2/28; H01M 2/02; H01M 6/08
(52) U.S. Cl. .................. 429/211; 429/161; 429/164; 29/623.1
(58) Field of Search .................. 429/161, 166, 429/24, 164

(56) References Cited

U.S. PATENT DOCUMENTS

| 3,732,124 A | * | 5/1973 | Cailley | 429/161 |
| 4,495,259 A | * | 1/1985 | Uba | 429/161 |
| 5,001,024 A | * | 3/1991 | Eberle | 429/160 |
| 6,013,389 A | * | 1/2000 | Nakamaru et al. | 429/161 |
| 6,040,086 A | | 3/2000 | Yoshida et al. | 429/211 |

FOREIGN PATENT DOCUMENTS

| JP | 61-32353 | * | 2/1986 | H01M/2/26 |

* cited by examiner

Primary Examiner—Stephen Kalafut
Assistant Examiner—Julian A. Mercado
(74) Attorney, Agent, or Firm—Jacobson Holman, PLLC

(57) ABSTRACT

A cell is provided in which a flat plate portion of a collector portion is prevented from making contact with a positive or negative electrode in a power generating element to cause a short circuit, the application area of a material can be widened, and edge portions of an electrode plate can be surely connected and fixed to a collector.

In a collector portion of a negative or positive collector, press holds of a gap (groove) which opens on the side of a basal portion are formed by bending back a substantially vertical metal plate at an apex. The portion between adjacent press holds of the collector portion is formed into a flat plate-like shape. A window is formed in each of the press holds, or a reduced thick portion is formed in a part of each of the press holds.

8 Claims, 13 Drawing Sheets

CELL

BACKGROUND OF THE INVENTION

The invention relates to a cell having a wound type power generating element in which strip positive and negative electrodes are wound with a strip separator therebetween.

FIG. 9 shows a configuration example of a non-aqueous electrolyte secondary cell having a wound type power generating element 1 of an elliptic cylindrical shape. The power generating element 1 is configured by winding strip negative and positive electrodes 1a and 1b with a strip separator 1c therebetween into an elliptic cylindrical shape. The negative and positive electrodes 1a and 1b are wound with being slightly shifted in the vertical direction from each other, so that only upper edge portions of the negative electrode 1a protrude from the upper end of the power generating element 1 and only lower edge portions of the positive electrode 1b protrude from the lower end. In this case, the active material is not applied to the upper edge portions of the negative electrode 1a, and to the lower edge portions of the positive electrode 1b, thereby allowing metal foils of the negative and positive electrodes 1a and 1b to be respectively exposed in the upper and lower ends of the power generating element 1. The wound separator 1c has a width at which the portion where the negative and positive electrodes 1a and 1b overlap with each other is surely covered and the upper and lower edge portions are not covered.

In such a non-aqueous electrolyte secondary cell, conventionally, a negative collector 2 such as shown in FIG. 10 is disposed on the upper end portion of the power generating element 1 so as to perform current collection on the negative electrode 1a. The negative collector 2 consists of a copper plate and is configured so that a collector portion 2a is formed above one side with respect to the center of the upper end portion of the power generating element 1. A flat platelike terminal connector 2b is drawn out from the collector portion 2a and placed above one semicircular area of the upper end portion of the power generating element 1. In the collector portion 2a, the copper plate is repeatedly bent into a bellow-like shape so as to form press holds 2c which upward protrude, and press insertions 2e which downward protrude. In each of the press holds 2c, the copper plate is bent back at the apex so that two vertical copper plate portions are opposed via a small gap therebetween. In each of the press insertions 2e, the copper plate is bent back at the bottom so that the gap between two inclined copper plate portions is gradually increased to form a V-like section shape.

In the negative collector 2, as shown in FIG. 11, plural edge portions of the negative electrode 1a protruding in the upper end of the power generating element 1 are pressingly held in bundle in each of the press holds 2c of the collector portion 2a and then connected and fixed by crimping and ultrasonic welding. In this case, the collector portion 2a is pressed down from the upper side to the upper end portion of the power generating element 1, thereby pressingly inserting the downward-protruding tip ends of the press insertions 2e into gaps between the upper edge portions of the negative electrode 1a. As a result, the upper edge portions of the negative electrode 1a are distributed by the inclined faces on the both sides of the V-like section shape, and then guided into the gaps of the press holds 2c.

A positive collector 3 such as shown in FIG. 12 is disposed on the lower end portion of the power generating element 1 so as to perform current collection on the positive electrode 1b. The positive collector 3 is structured in the same manner as the negative collector 2, and has a collector portion 3a. However, the positive collector consists of an aluminum plate in place of a copper plate. In the positive collector 3, edge portions of the positive electrode 1b protruding in the lower end of the power generating element 1 are pressingly held in each of press holds 3c of the collector portion 3a and then connected and fixed by crimping and ultrasonic welding. In this case, similarly, the edge portions of the positive electrode 1b are distributedly guided by press insertions 3e into the gaps of the press holds 3c. In this example, however, a terminal connector 3b is drawn out above the upper end portion of the power generating element 1. In the case where the positive terminal 5 is to protrude from a lower portion of the power generating element 1, also the terminal connector 3b is disposed below the lower end portion of the power generating element 1.

For the sake of simplicity, in the figures, the negative electrode 1a, the positive electrode 1b, and the like of the power generating element 1 are shown so as to be wound coarsely or with a reduced number of turns. In an actual case, they are wound very closely or with a large number of turns, so that many edge portions of the negative and positive electrodes 1a and 1b are pressingly held in the gaps of the press holds 2c and 3c of the collector portions 2a and 3a and then connected and fixed. In some case, the collector portions 2a and 3a of the negative and positive collectors 2 and 3 are disposed not only in one side with respect to the center of the power generating element 1, but also above and below the both sides with respect to the center, thereby improving the current collecting efficiency.

In the negative and positive electrodes 1a and 1b of the power generating element 1, however, very thin metal foils of copper, aluminum, or the like are exposed in the upper and lower edge portions. When the tip ends of the press insertions 2e and 3e of the collector portions 2a and 3a are actually pressingly inserted between the edge portions of the negative and positive electrodes 1a and 1b, therefore, the tip ends catch the inclined faces on the both sides of the V-like section shape, thereby producing a problem in that the edge portions cannot be smoothly guided into the gaps of the press holds 2c and 3c.

Since the press insertions 2e and 3e are disposed in the collector portions 2a and 3a, the tip ends of the press insertions 2e and 3e are pushed into the power generating element 1. Therefore, there arise further problems in that the tip ends may make contact with the positive or negative electrode 1b or 1a which is not subjected to current collection, to cause a short circuit, and that the application area of the active material is narrowed and hence the cell capacity is reduced. When the negative electrode 1a is to be connected and fixed to the press holds 2c of the collector portion 2a, for example, the upper end of the positive electrode 1b which is placed with being downward shifted approaches the tip ends of the press insertions 2e as shown in FIG. 13. Therefore, there arises a possibility that the upper end makes contact with the tip end so as to cause a short circuit. In order to prevent such a short circuit from occurring, the amount of shift in each of the negative and positive electrodes 1a and 1b may be increased. However, this causes the area where the active material is not applied, to be widened. Consequently, the application area is reduced by an area corresponding to the widened area, thereby reducing the cell capacity.

The problem that the edge portions of the negative and positive electrodes 1a and 1b cannot be smoothly inserted into the gaps of the press holds 2c and 3c may be solved by employing the following configuration. Comb-like jigs which are made of a material of a low coefficient of friction and an excellent sliding property are prepared so as to have elongated V-like teeth in which the tip end is smaller in angle than the press insertions 2e and 3e. The jigs are pressed into the upper and lower end portions of the power generating element 1 so that the upper and lower edge portions of the negative and positive electrodes 1a and 1b are previously distributed to positions respectively corresponding to the gaps of the press holds 2c and 3c. Thereafter, the collector portions 2a and 3a of the negative and positive collectors 2 and 3 are inserted thereinto. However, this countermeasure also cannot solve the problems that the tip ends of the press insertions 2e and 3e may cause a short circuit, and that the application area of the active material is narrowed.

SUMMARY OF THE INVENTION

The invention has been conducted in view of such circumstances. It is an object of the invention to provide a cell in which a press hold is directly disposed in a flat metal plate, so that a short circuit with an electrode is prevented from occurring and the application area of the active material can be widened.

The cell of the invention of claim 1 is characterized in that a collector portion of each of collectors comprises: plural press holds in each of which two metal plate portions are projected to be opposed via a gap that opens on a side of a basal portion, by bending back a substantially vertical metal plate at an apex; and flat plate portions which are formed by a flat metal plate portion and through which adjacent ones of the press holds are coupled to each other on the side of the basal portion, the collector portions are respectively placed on ends of a winding axis of a wound type power generating element, with respectively directing the basal portions to the ends, the power generating element being configured by winding strip positive and negative electrodes with a strip separator therebetween with being mutually shifted in the winding axis direction, and edge portions of the positive and negative electrodes which protrude in the ends of the winding axis of the power generating element are pressingly held in nearest press holds of the collector portions to be connected and fixed.

According to the invention of claim 1, the plural press holds which connect and fix the edge portions of the corresponding electrode are coupled to one another through the flat plate portions, and hence the portions are not pushed into the power generating element. Consequently, the electrode which is not connected and fixed by the press holds is prevented from making contact with the collector portion to cause a short circuit. This allows the amount of shift in winding of the positive and negative electrodes, to be reduced. As a result, the area to which the active material is applied can be widened so as to increase the cell capacity.

The cell of the invention of claim 2 is characterized in that the edge portions of the electrodes are inserted between the two metal plate portions of the corresponding press hold of the collector portions, and then connected and fixed to the two metal plate portions by crimping and ultrasonic welding.

According to the invention of claim 2, the edge portions of the electrodes can be surely connected and fixed to the press holds of the collector portions by crimping and ultrasonic welding.

The cell of the invention of claim 3 is characterized in that, in the cell of claim 1, a window is formed in a part of one of the metal plate portions of each of the press holds of the collector portions of the collectors, the window communicating with the gap between the one metal plate portion and the other metal plate portion.

According to the invention of claim 3, the window is formed in a part of one of the metal plate portions of each press hold, and hence the plural electrode edge portions which are pressingly held in the press hold can be surely welded together so as to be connected and fixed, by welding which is performed through the window. The edge portions of the electrodes are exposed to one side through the window. Therefore, welding is not restricted to that based on vibration, such as ultrasonic welding, and may be performed by directly applying heat, as in the case of laser welding.

The cell of the invention of claim 4 is characterized in that the edge portions of the electrodes of the cell of claim 3 are connected and fixed by inserting the edge portions between the two metal plate portions of the corresponding press hold of the collector portions and then crimping the metal plate portions, and also by ultrasonic welding of the window of the one metal plate portion and the other metal plate portion, and a part of the one metal plate portion other than the window and the other metal plate portion.

According to the invention of claim 4, the plural electrode edge portions which are pressingly held in the press hold can be surely held between the part of the one metal plate portion other than the window and the other metal plate portion, by crimping and ultrasonic welding in the same manner as the prior art. Between the one metal plate portion and the other metal plate portion, the plural electrode edge portions are directly ultrasonic welded, and hence surely welded together to be firmly connected and fixed.

The cell of the invention of claim 5 is a cell comprising: a power generating element in which positive and negative electrode plates are wound or laminated with a separator therebetween and an edge portion of one of the electrode plates protrude from an edge portion of another one of the electrode plates; and collectors respectively connected to the edge portions, and characterized in that each of the collectors is formed by bending a metal plate to have plural groove portions which are used for pressingly holding and bonding the edge portion of either of the electrode plates, and a reduced thickness portion is formed in a part of each of the groove portions.

According to the invention of claim 5, the reduced thickness portion is formed in a part of each of the metal plates which is used for pressingly holding edge portions of the corresponding electrode plate. Therefore, the plural electrode edge portions which are pressingly held in the press hold can be surely melted and welded so as to be connected and fixed by welding which is performed through the reduced thickness portion. Both ends of the electrode edge portions are pressingly held by the press holds. Even when a certain external force is applied to the edge portions during ultrasonic welding or after the production of the cell, therefore, the electrode is not broken. As a result, it is possible to attain excellent environmental resistant properties.

The cell of the invention of claim 6 is characterized in that each of the collectors of the cell of claim 5 is formed by a plate member of a thickness of 0.5 to 2 mm and the reduced thickness portion has a thickness which is 10% to 80% of the thickness of the collector.

When the thickness of the reduced thickness portion is adjusted in the range specified in claim 6, welding is not restricted to that based on vibration, such as ultrasonic welding, and can be performed by applying heat through the reduced thickness portion by means of laser welding or the like.

PREFERRED EMBODIMENTS OF THE INVENTION

Hereinafter, embodiments of the invention will be described with reference to the accompanying drawings.

Figure 1:
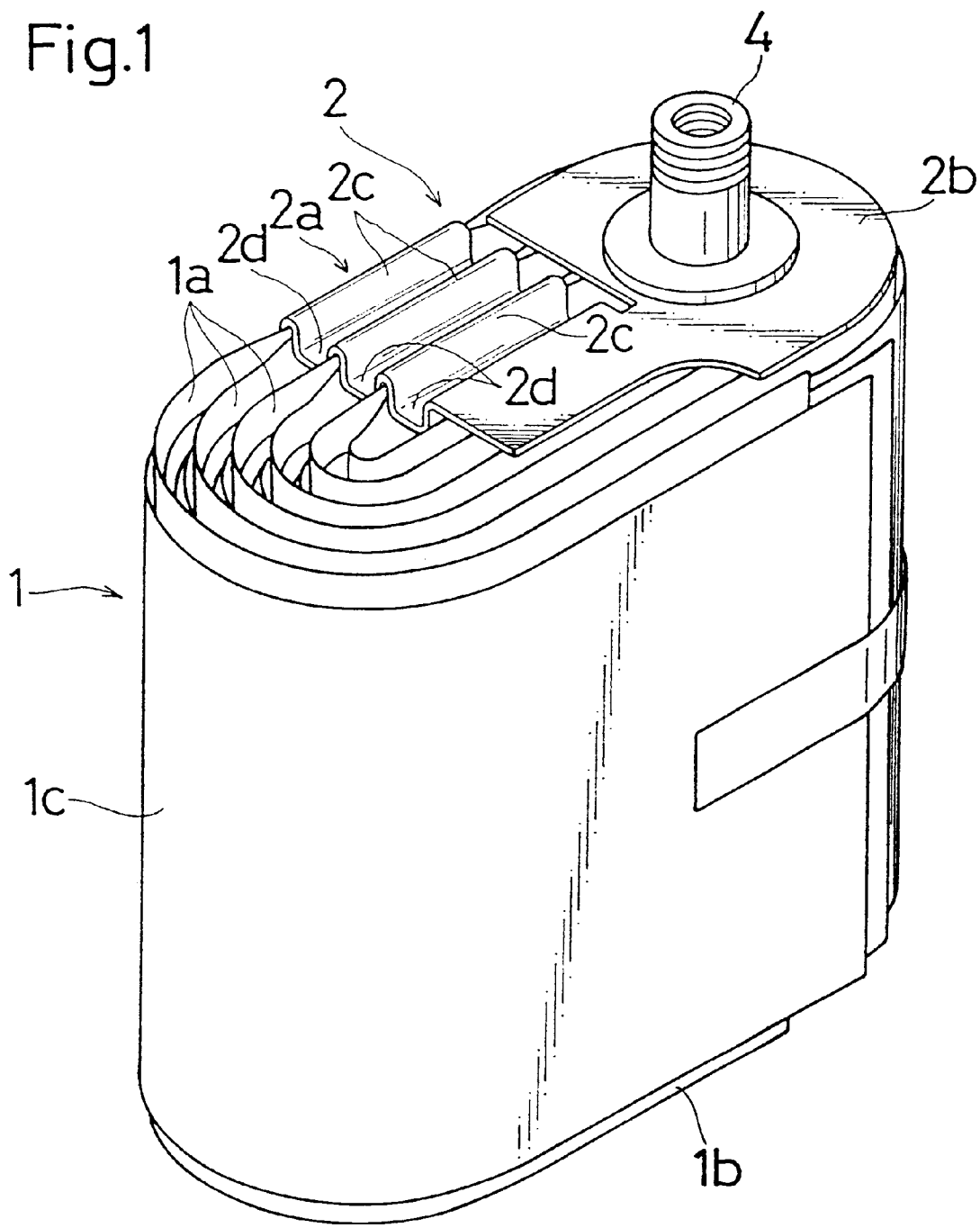
FIG. 1 is a perspective view showing a first embodiment of the invention and showing a negative collector which is connected and fixed to a power generating element.
Figure 2:
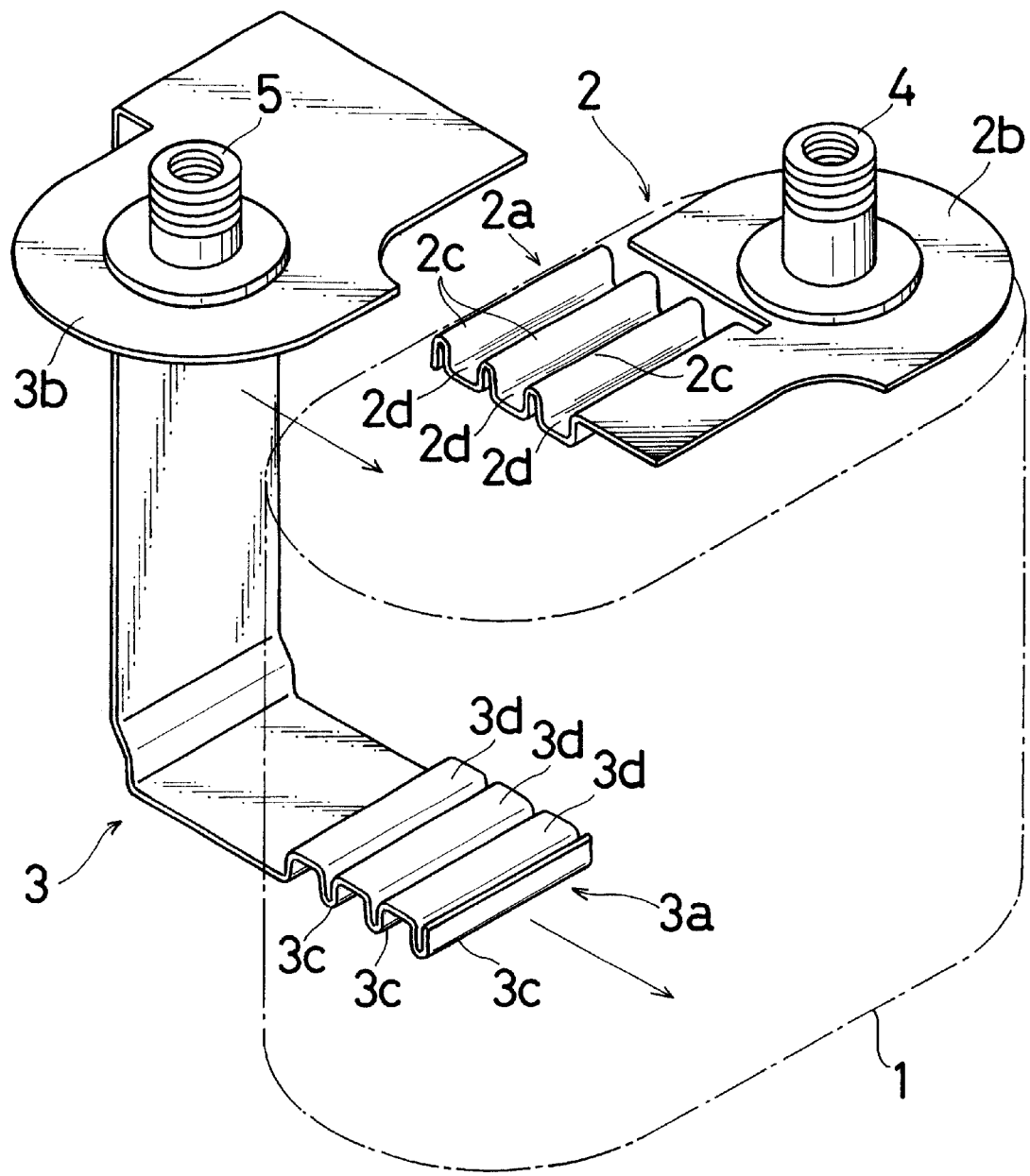
FIG. 2 is a perspective view showing the first embodiment of the invention and showing the configuration of the negative collector and a positive collector which are to be connected and fixed to the power generating element.
Figure 3:
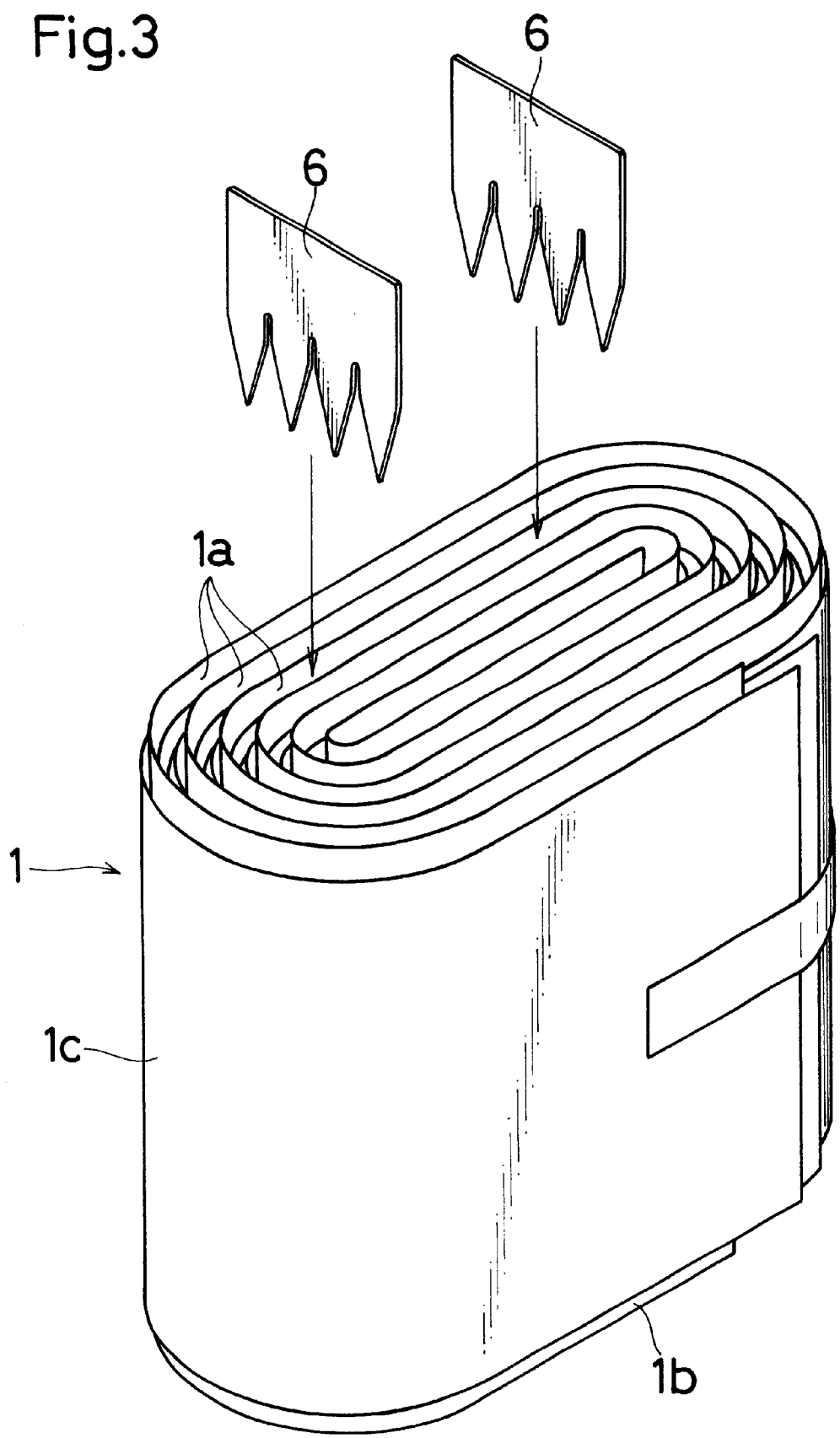
FIG. 3 is a perspective view showing the first embodiment of the invention and showing jigs which are used for distributing edge portions of a negative electrode which protrude from the upper end of the power generating element.
Figure 4:
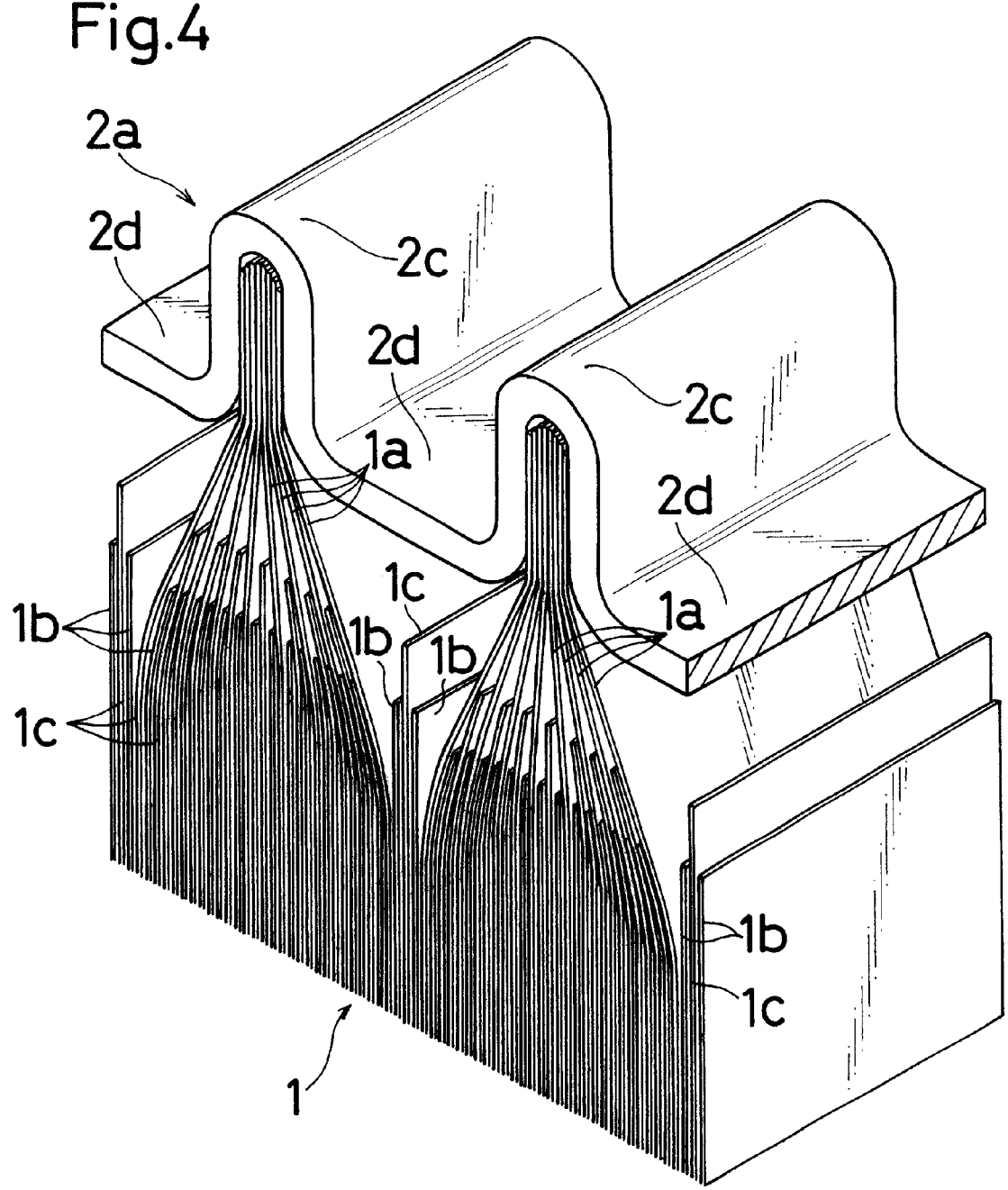
FIG. 4 is a partial enlarged view showing the first embodiment of the invention and showing a state where the edge portions of the negative electrode are pressingly held by press holds portions of a collector portion.

FIGS. 1 to 4 show a first embodiment of the invention. FIG. 1 is a perspective view showing a negative collector which is connected and fixed to a power generating element, FIG. 2 is a perspective view showing the configuration of the negative collector and a positive collector which are to be connected and fixed to the power generating element, FIG. 3 is a perspective view showing jigs which are used for distributing edge portions of a negative electrode which protrude from the upper end of the power generating element, and FIG. 4 is a partial enlarged view showing a state where the edge portions of the negative electrode are pressingly held by press holds of a collector portion. The components which have the same function as those of the prior art shown in FIGS. 9 to 13 are denoted by the same reference numerals.

Figure 9:
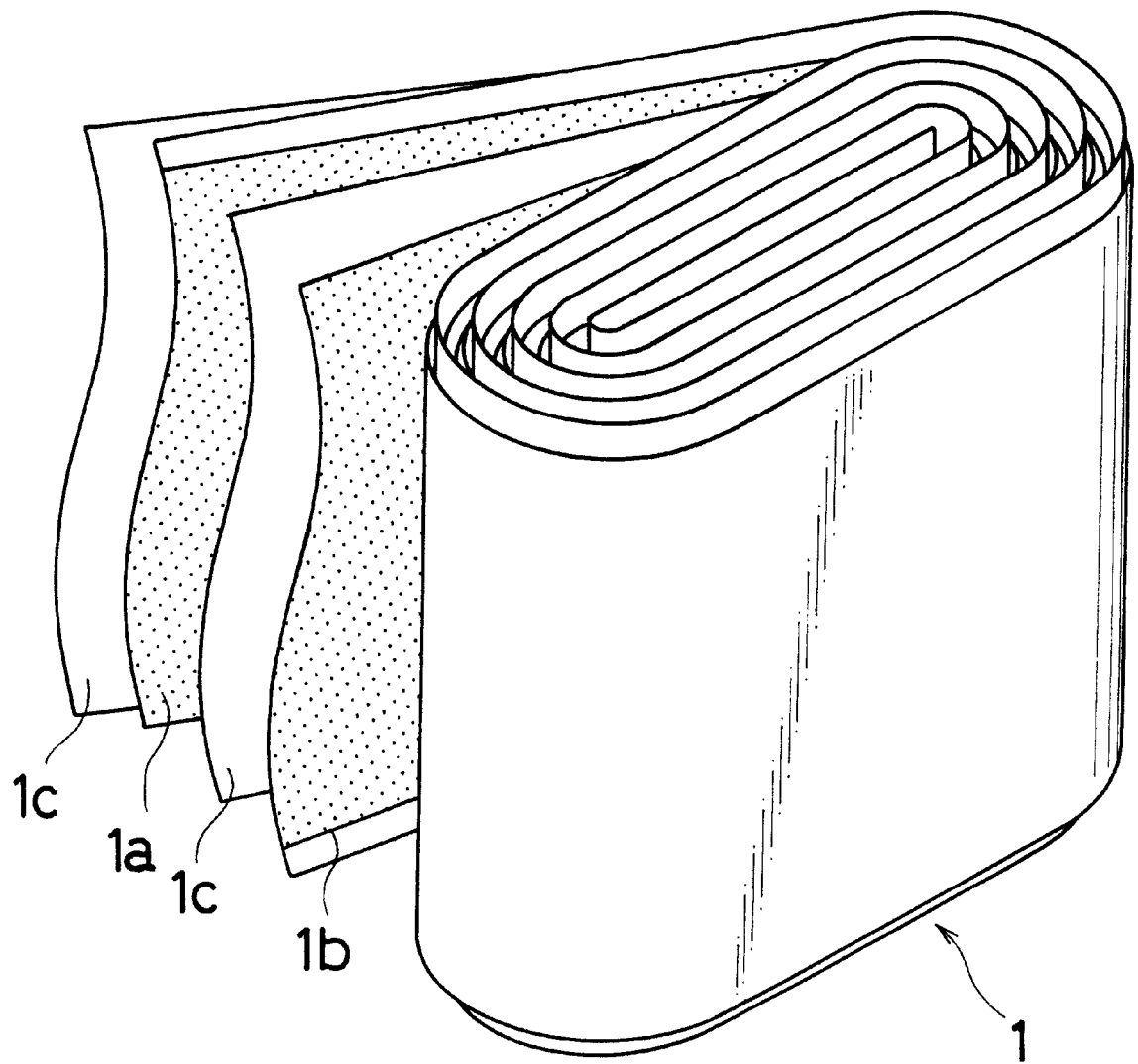
FIG. 9 is a perspective view showing the configuration of a power generating element of a usual non-aqueous electrolyte secondary cell.
Figure 10:
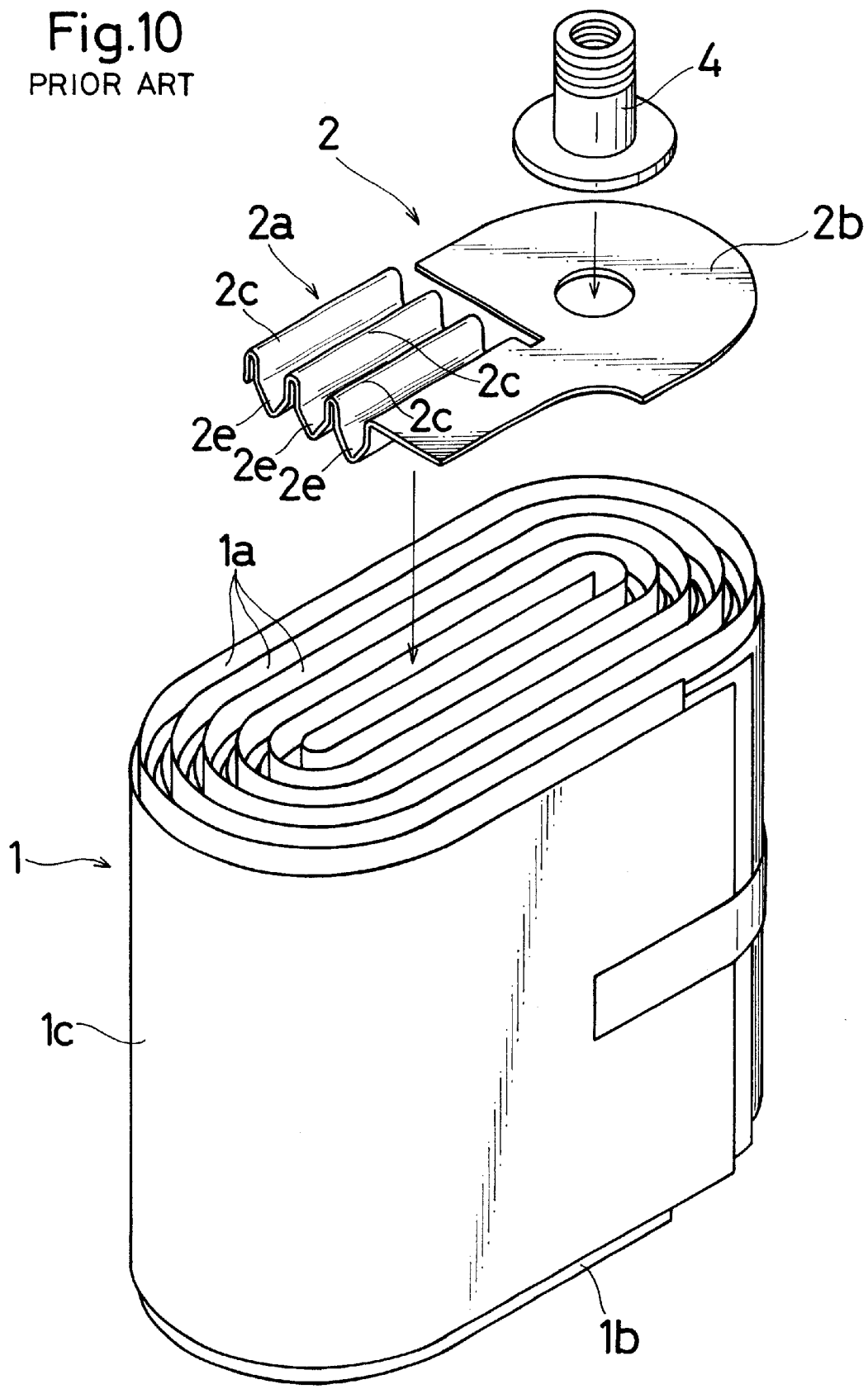
FIG. 10 is a perspective view showing a prior art example and showing the configuration of a negative collector which is to be connected and fixed to a power generating element.
Figure 11:
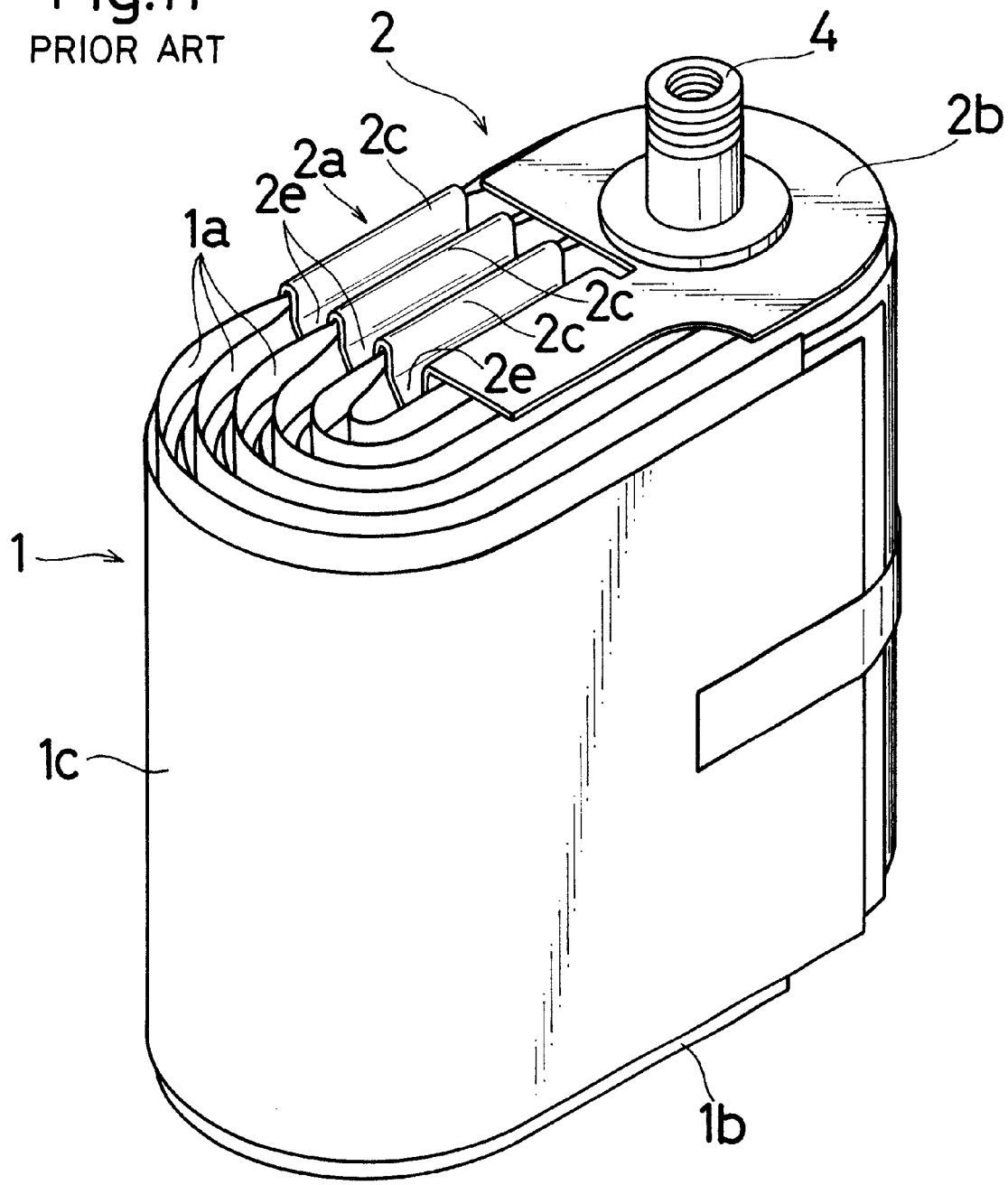
FIG. 11 is a perspective view showing the prior art example and showing the negative collector which is connected and fixed to the power generating element.
Figure 12:
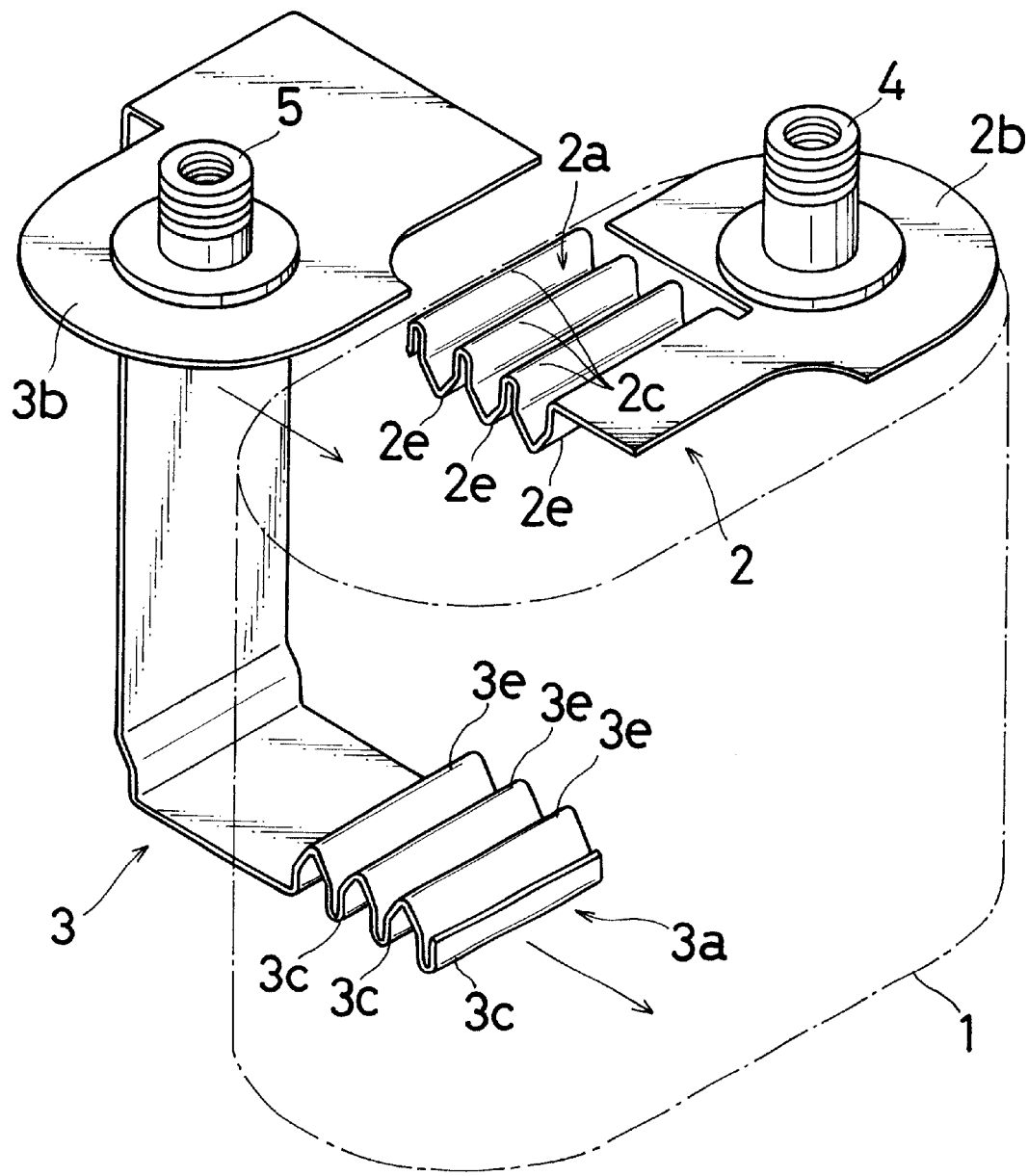
FIG. 12 is a perspective view showing the prior art example and showing the configuration of the negative collector and a positive collector which are to be connected and fixed to the power generating element.
Figure 13:
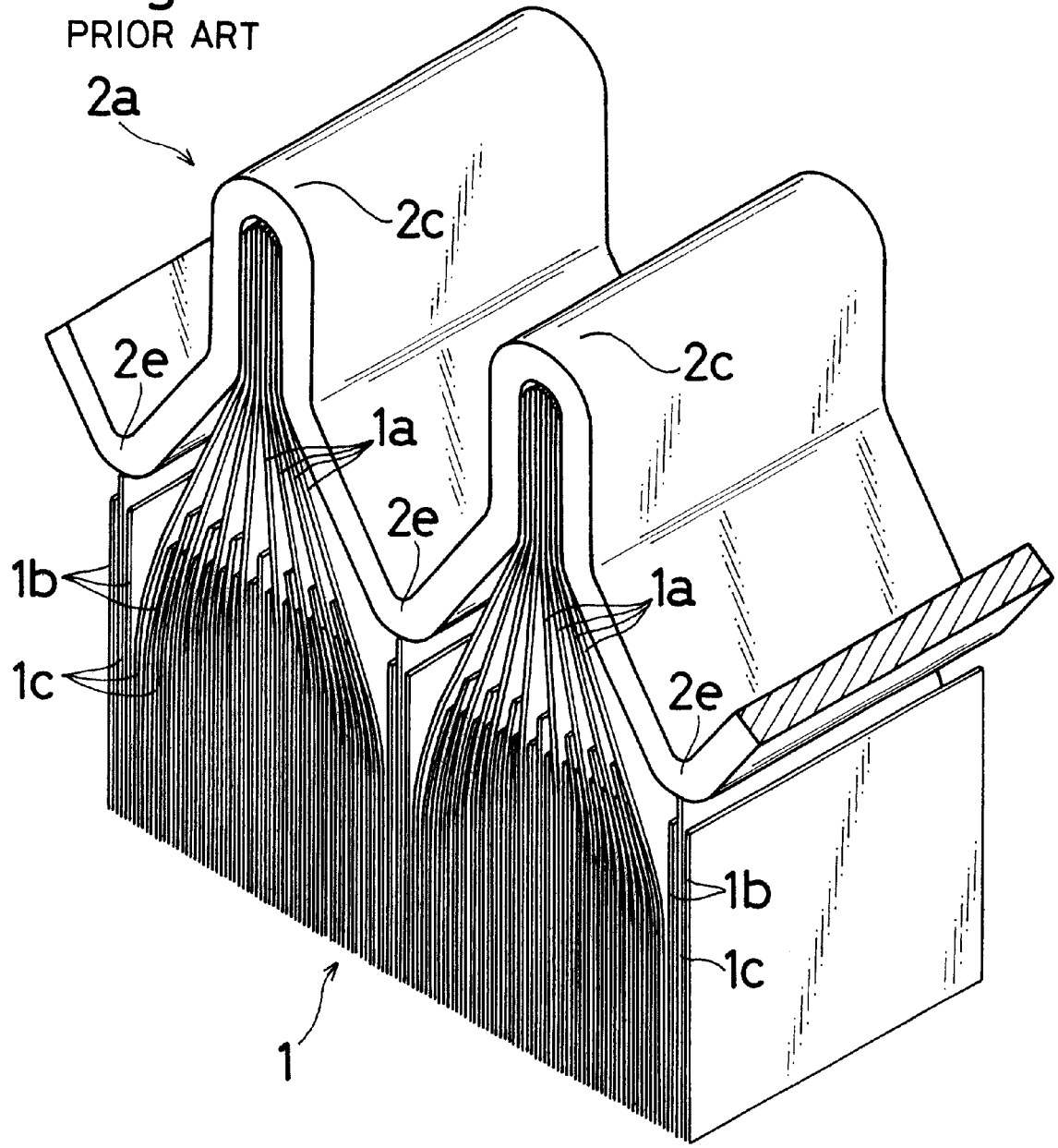
FIG. 13 is a partial enlarged view showing the prior art example and showing a state where edge portions of the negative electrode are pressingly held by press holds of a collector portion.

The embodiment is a non-aqueous electrolyte secondary cell which is useful in an electric vehicle and the like and which comprises a power generating element 1 that is wound into an elliptic cylindrical shape. In the same manner as shown in FIG. 9, the power generating element 1 of the non-aqueous electrolyte secondary cell is configured so that negative and positive electrodes 1a and 1b are wound with being slightly shifted from each other in the vertical direction (the direction of the winding axis), thereby causing only upper edge portions of the negative electrode 1a to protrude from the upper end of the power generating element 1, and only lower edge portions of the positive electrode 1b to protrude from the lower end. The negative electrode 1a is formed by applying a negative active material such as graphite to the surface of a strip copper foil, and the positive electrode 1b is formed by applying a positive active material such as a lithium cobalt complex oxide to the surface of a strip aluminum foil. In the negative electrode 1a, the negative active material is applied only to a portion other than the upper edge portions, and, in the positive electrode 1b, the positive active material is applied only to a portion other than the lower edge portions, so that the copper foil and the aluminum foil protrude from the upper and lower ends of the power generating element 1 while the foils are exposed therefrom, respectively. A strip microporous plastic film is used as a separator 1c. The separator is wound so as to have a width at which the portion where the negative and positive electrodes 1a and 1b overlap with each other is surely covered and the upper and lower edge portions are not covered.

Negative and positive collectors 2 and 3 such as shown in FIG. 2 are connected to the power generating element 1. The negative collector 2 is formed by performing a press working on a copper plate. A collector portion 2a is placed above one side with respect to the center of the upper end portion of the power generating element 1. In the collector portion 2a, a press hold 2c is formed in three positions by bending the copper plate of the negative collector 2, and a flat plate portion 2d is disposed between adjacent ones of the press holds 2c. Each of the press holds 2c is formed by upward bending the horizontal flat copper plate and then folding back the plate at the apex so that two copper plate portions are projected to be opposed to each other. A gap that downward opens is formed between the two oppositely protruding copper plate portions. Each of the flat plate portions 2d is a horizontal flat platelike portion through which the lower portions of adjacent ones of the press holds 2c are coupled to one another, and is disposed in order to form a gap of a substantial degree between the press holds 2c.

One end of the collector portion 2a of the negative collector 2 is raised to a level which is equal to or higher than the levels of the upper end portions of the press holds 2c, and then drawn into a space above one semicircular area of the upper end portion of the power generating element 1, to be coupled to a horizontal flat plate-like terminal connector 2b. A lower end portion of a negative terminal 4 is connected and fixed to the terminal connector 2b by crimping. The positive collector 3 is formed by performing a press working on an aluminum plate, and configured in a similar manner as the negative collector 2. A collector portion 3a is formed so as to be upside down. One end of the collector portion 3a is drawn out along the side face of the power generating element 1 to a space above the other semicircular area of the upper end portion to be coupled to a horizontal flat plate-like terminal connector 3b. A lower end portion of a positive terminal 5 is connected and fixed to the terminal connector 3b by crimping.

In the power generating element 1, as shown in FIG. 3, a comb-like jig 6 in which downward-directed V-like teeth are formed is first inserted into one side of the upper end portion with respect to the center, thereby distributedly collecting edge portions of the negative electrode 1a protruding in the upper end of the power generating element 1, to three places. The jig 6 is formed by using a material of high hardness such as high density polyethylene, and the angle of the tip end of each tooth is made small so that the V-like shape is elongated. As a result, the edge portions of the negative electrode 1a can be smoothly distributed without wrinkling or breaking the copper foil exposed in the edge portions.

Next, as shown in FIG. 1, the negative collector 2 is placed on the upper end portion of the power generating element 1, so that the sets of plural edge portions of the negative electrode 1a which have been distributed by the jig 6 are pressingly held in the gaps of the press holds 2c of the collector portion 2a, respectively. When the edge portions of the negative electrode 1a are once pressingly held by the press holds 2c, the jig 6 is detached from the power generating element. In each of the press holds 2c, the two copper plate portions are crimped, and ultrasonic welding is performed, whereby, in the edge portions of the negative electrode 1a which are pressingly held by the press hold 2c, the areas from which the copper foil is exposed are connected and fixed to the collector portion 2a. The crimping work is performed by inserting an attachment of a crimping tool on the both sides of each of the press holds 2c, from the upper side, and then applying a force so as to collapse the two copper plate portions. The ultrasonic welding is performed by inserting an attachment of an ultrasonic welder on the both sides of each of the press holds 2c, from the upper side, and then applying ultrasonic vibration to the two copper plate portions. In order to form a space into which such an attachment is to be inserted, between adjacent press holds 2c, the flat plate portions 2d are disposed so as to form a gap of a substantial degree between the press holds, as described above. For the sake of simplicity, in the figures, the negative electrode 1a, the positive electrode 1b, and the like of the power generating element 1 are shown so as to be wound coarsely or with a reduced number of turns. In an actual case, they are wound very closely or with a large number of turns, so that many edge portions of the negative electrode 1a are pressingly held in the gaps of the press holds 2c of the collector portion 2a and then connected and fixed.

In the positive collector 3 also, in the same manner as the negative collector 2, plural edge portions of the positive electrode 1b protruding in the lower end of the power generating element 1 are pressingly held in bundle, in the area from which the aluminum foil is exposed, in each of press holds 3c of the collector portion 3a, and then connected and fixed by crimping and ultrasonic welding. The terminal connector 3b of the positive collector 3 which is drawn out from the collector portion 3a to the upper end is overlappingly placed above the collector portion 2a of the negative collector 2. An insulation member is inserted between the collector portions so as to prevent a short circuit from occurring.

The power generating element 1 in which the negative and positive collectors 2 and 3 are connected and fixed as described above is housed in a cell case (not shown) of an elliptic cylindrical shape, a non-aqueous electrolyte solution is then poured into the case, and the case is hermetically sealed, thereby producing a non-aqueous electrolyte secondary cell. The negative and positive terminals 4 and 5 are projected from the upper portion of the cell with being insulatingly sealed.

According to this configuration, the plural press holds 2c and 3c which are used for connecting and fixing the edge portions of the negative and positive electrodes 1a and 1b are coupled to one another via the flat plate portions 2d and 3d, respectively, and the flat plate portions 2d and 3d are not pushed into the power generating element 1. Therefore, there is no fear of a short circuit, and the cell capacity can be increased. When the negative electrode 1a is connected and fixed to the press holds 2c of the collector portion 2a as shown in FIG. 4, for example, a sufficiently large distance is maintained between the upper end of the positive electrode 1b which is placed with being downward shifted, and the rear faces of the flat plate portions 2d, and hence there is no possibility that the electrode makes contact with the flat plate portions to cause a short circuit. As far as the upper end of the positive electrode 1b is sufficiently separated from the rear faces of the flat plate portions 2d in this way, there arises no fear of a short circuit even when the amount of shift in each of the negative and positive electrodes 1a and 1b is reduced. This enables the area where the active material is not applied, to be narrowed, so that the application area is increased by an area corresponding to the narrowed area, thereby increasing the cell capacity. This is applicable also to the case where the positive electrode 1b is connected and fixed to the press holds 3c of the collector portion 3a.

Next, a second embodiment of the invention will be described.

In the first embodiment, the very thin metal foils are exposed in the edge portions of the negative and positive electrodes 1a and 1b of the power generating element 1. By contrast, the metal plates constituting the press holds 2c and 3c of the collector portions 2a and 3a in the negative and positive collectors 2 and 3 have a substantially large thickness, in order to allow sufficiently large charging and discharging currents to flow therethrough and hold the power generating element 1 in the cell case. When ultrasonic welding is performed via the two thick metal plate portions of each of the press holds 2c or 3c, therefore, ultrasonic vibration may not be surely transmitted to the large number of metal foils of the edge portions of the negative or positive electrode 1a or 1b which are pressingly held between the metal plate portions, and, particularly, metal foils in the vicinity of the middle of the stack fail to be sufficiently fusion bonded. This produces a problem in that the cell properties may be lowered as the number of the charging and discharging cycles of the cell is increased. When the power of ultrasonic welding is increased so as to solve this problem, there arises a new problem in that the edge portions of the negative or positive electrode 1a or 1b which are formed by thin metal foils may be broken by strong ultrasonic vibration. The second embodiment can solve this problem.

Figure 5:
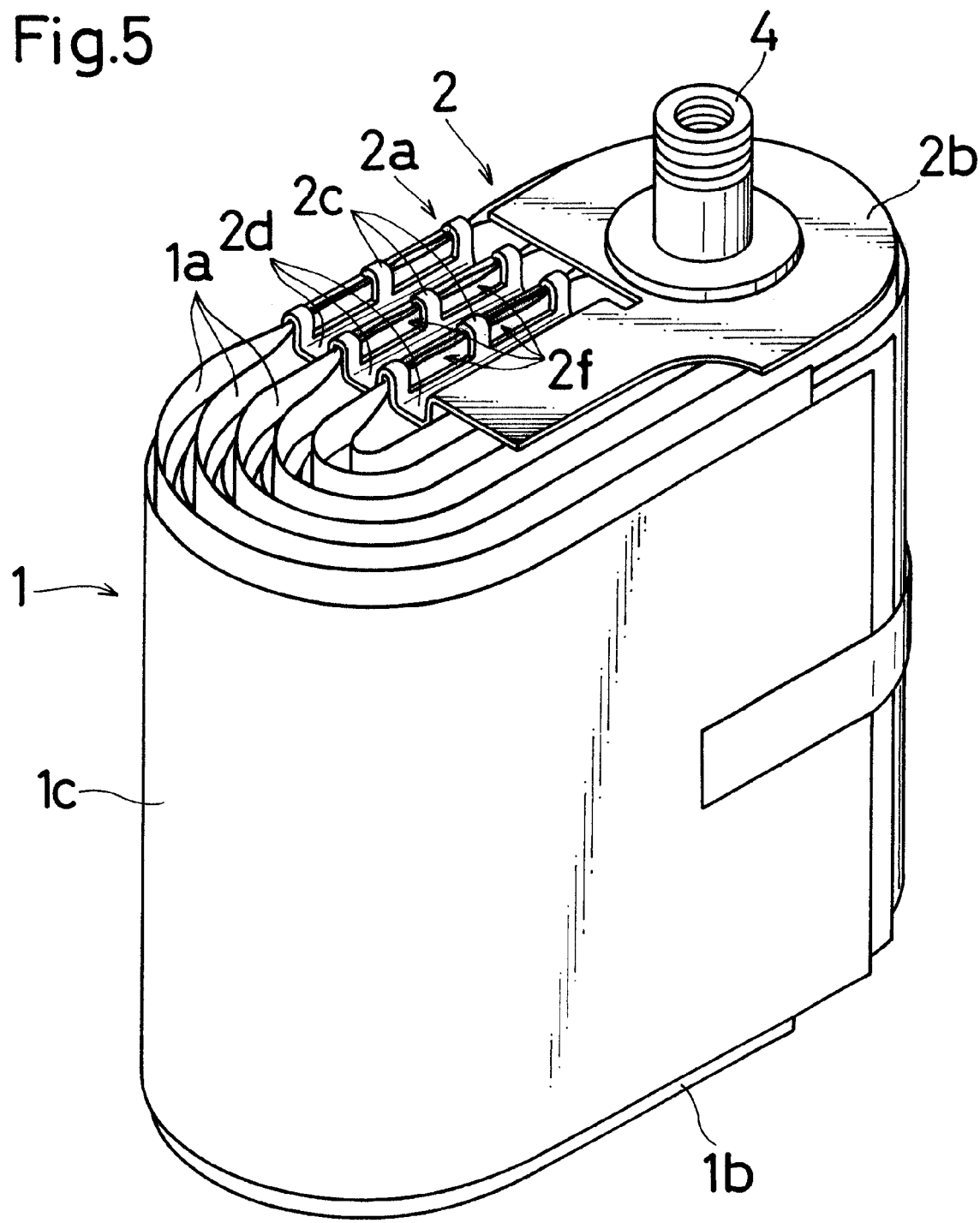
FIG. 5 is a perspective view showing a second embodiment of the invention and showing a negative collector which is connected and fixed to a power generating element.
Figure 6:
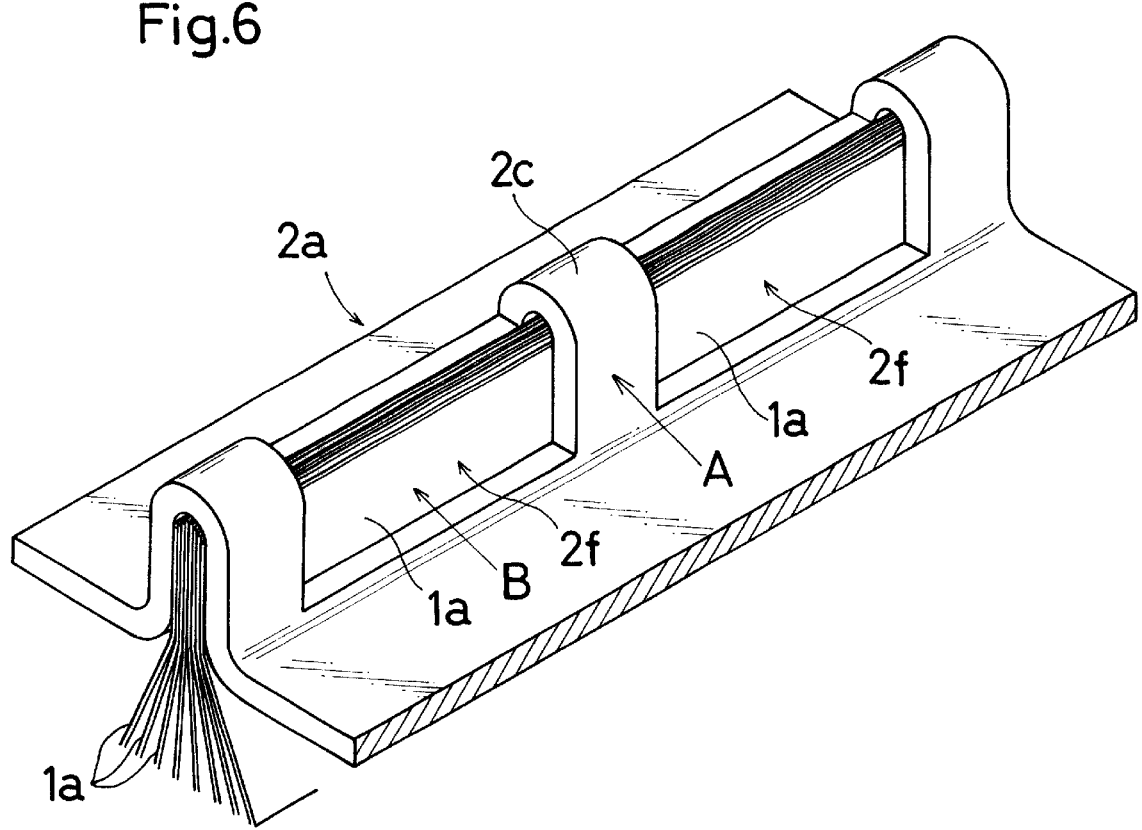
FIG. 6 is a partial enlarged view showing the second embodiment of the invention and enlargedly showing a collector portion of the negative collector.

FIGS. 5 and 6 show the second embodiment of the invention. FIG. 5 is a perspective view showing a negative collector which is connected and fixed to a power generating element, and FIG. 6 is a partial enlarged view enlargedly showing a collector portion of the negative collector.

A negative collector 2 such as shown in FIG. 5 is connected to a negative electrode 1a of the power generating element 1. The negative collector 2 is formed by a copper plate. A collector portion 2a is formed above one side with respect to the center of the upper end portion of the power generating element 1. A flat plate-like terminal connector 2b is drawn out from the collector portion 2a so as to be placed above one semicircular area of the upper end portion of the power generating element 1. In the collector portion 2a, a press hold 2c is formed in three positions by bending the copper plate of the negative collector 2, and a flat plate portion 2d is disposed between adjacent ones of the press holds 2c. Each of the press holds 2c is formed by upward bending the horizontal flat copper plate and then folding back the plate at the apex so that two copper plate portions are projected to be opposed to each other. A gap that downward opens is formed between the two opposedly protruding copper plate portions. A window 2f is formed in a part of one of the two copper plate portions. In the embodiment, as shown in FIG. 6, the window 2f is formed in two places of the one copper plate portion so as to leave the ends and the center. The number and positions of the windows 2f may be arbitrarily selected. Preferably, the windows 2f are formed so as to occupy 10% to 80% of the total area of the one copper plate portion. The configuration will be described in which the windows 2f are opened so as to elongate from the one copper plate portion to the whole area of the apex formed by the copper plate portions, in order to facilitate checking of the state of ultrasonic welding that will be described later. It is not necessary to open the apex also.

In the power generating element 1, the comb-like jig 6 (see FIG. 3) in which downward-directed V-like teeth are formed is first inserted into one side of the upper end portion with respect to the center, thereby distributedly collecting edge portions of the negative electrode 1a protruding in the upper end of the power generating element 1, to three places. Next, as shown in FIG. 5, the negative collector 2 is placed on the upper end portion of the power generating element 1, so that the sets of plural edge portions of the negative electrode 1a which have been distributed by the jig 6 are pressingly held in the gaps of the press holds 2c of the collector portion 2a, respectively. In each of the press holds 2c, the part of the one copper plate portion other than the windows 2f and the other copper plate portion are crimped. The crimping work is performed by inserting an attachment of a crimping tool on the both sides of each of the press holds 2c, from the upper side, and then applying a force so as to collapse the two copper plate portions. In each of the press holds 2c, as indicated by the arrow A in FIG. 6, ultrasonic welding is performed between the part of the one copper plate portion other than the windows 2f and the other copper plate portion, and, as indicated by the arrow B of FIG. 6, ultrasonic welding is performed also between the windows 2f of the one copper plate portion and the other copper plate portion. The ultrasonic welding is performed by inserting an attachment of an ultrasonic welder on the both sides of each of the press holds 2c, from the upper side, and then applying ultrasonic vibration to the two copper plate portions. In the part of the one copper plate portion other than the windows 2f and indicated by the arrow A, the two thick copper plate portions are crimped and the edge portions of the negative electrode 1a between the copper plate portions are welded. Therefore, ultrasonic welding of a high power is performed in the part. In the windows 2f of the one copper plate portion and indicated by the arrow B, the thin copper foils of the edge portions of the negative electrode 1a are directly welded, and hence ultrasonic welding of a restricted power is performed.

In also the positive collector 3 which is not shown in FIG. 5, in the same manner as the negative collector 2, plural edge portions of the positive electrode 1b protruding in the lower end of the power generating element 1 are pressingly held in bundle, in the area from which the aluminum foil is exposed, in each of press holds 3c of the collector portion 3a, and then connected and fixed by crimping and ultrasonic welding the part other than the windows of the one aluminum plate portion, and ultrasonic welding the windows of the one aluminum plate portion.

According to this configuration, the windows 2f are formed in a part of one of the metal plate portions of each of the press holds 2c and 3c of the collector portions 2a and 3a of the negative and positive collectors 2. Therefore, the plural edge portions of the negative and positive electrodes 1a and 1b which are pressingly held by the press holds can be surely welded together so as to be connected and fixed by ultrasonic welding which is directly performed through the windows. Therefore, there is no fear that the cell properties are lowered in accordance with the use of the cell. Furthermore, also the part of one of the metal plate portions of each of the press holds 2c and 3c other than the windows 2f can surely hold the plural edge portions of the negative or positive electrode 1a or 1b by means of crimping and ultrasonic welding.

Next, a third embodiment of the invention will be described.

In the second embodiment, the windows 2f are formed in a part of one of the two metal plate portions of each of the press holds 2c of the collector portion 2a of the negative collector 2, and the windows communicate with the gap between the one metal plate portion and the other metal plate portion. When the plural edge portions of the electrode which are pressingly held in the press holds 2c are connected and fixed by performing welding through the windows 2f, there arises a disadvantage that the foils which are nearest to the windows are easily broken. The third embodiment can solve this problem.

Figure 7:
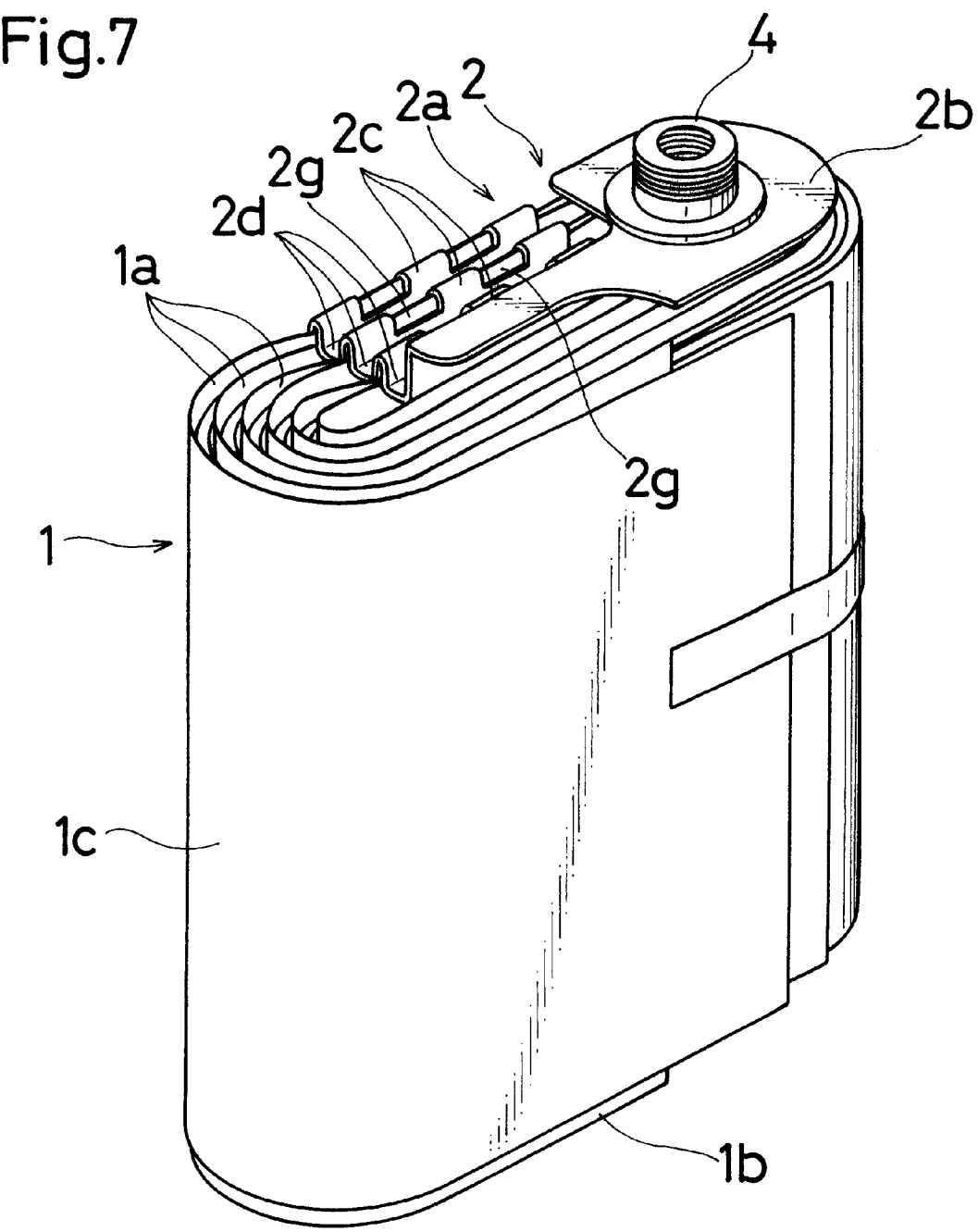
FIG. 7 is a perspective view showing a third embodiment of the invention and showing a negative collector which is connected and fixed to a power generating element.
Figure 8:
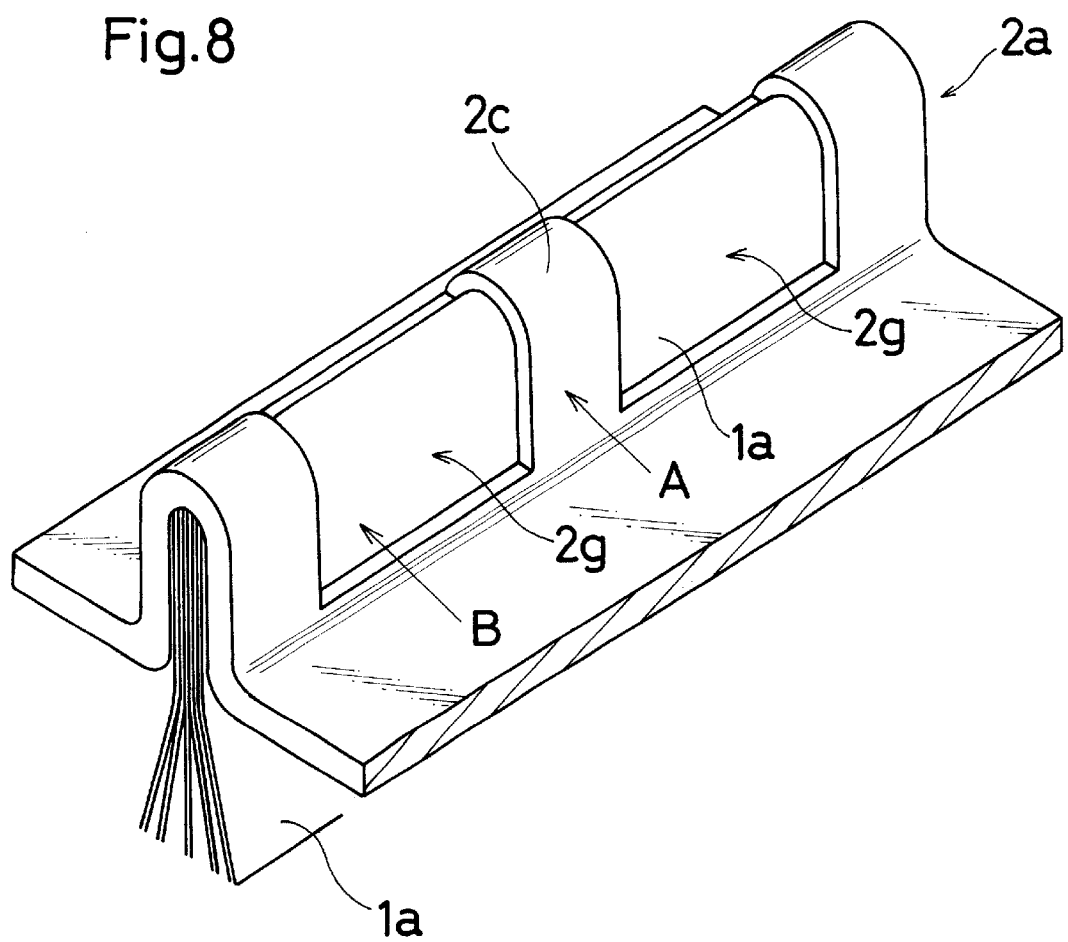
FIG. 8 is a partial enlarged view showing the third embodiment of the invention and enlargedly showing a collector portion of the negative collector.

FIGS. 7 and 8 show the third embodiment of the invention. FIG. 7 is a perspective view showing a negative collector which is connected and fixed to a power generating element, and FIG. 8 is a partial enlarged view enlargedly showing a collector portion of the negative collector.

In the embodiment, a reduced thickness portion 2g is formed in place of disposing the windows 2f of the second embodiment, in the following manner.

The reduced thickness portion 2g is formed in a part of one of the two copper plate portions of the negative collector 2. In the embodiment, as shown in FIG. 8, the reduced thickness portion 2g is formed in two places of the one copper plate portion so as to leave the ends and the center. The number and positions of the reduced thickness portions 2g may be arbitrarily selected. Preferably, the reduced thickness portions 2g are formed so as to occupy 10% to 80% of the total area of the one copper plate portion. The configuration will be described in which the reduced thickness portions 2g are formed so as to elongate from the one copper plate portion to the whole area of the apex formed by the copper plate portions, in order to facilitate checking of the state of ultrasonic welding that will be described later. It is not necessary to form the reduced thickness portions also in the apex.

Preferably, the negative collector 2 is formed by a plate member of a thickness of 0.5 to 2 mm and the reduced thickness portions 2g have a thickness which is 10% to 80% of the thickness of the collector. When the thickness is adjusted so as to have such a value, welding is not restricted to that based on vibration, such as ultrasonic welding, and can be performed by applying heat through the reduced thickness portions 2g by means of laser welding or the like.

In the power generating element 1, the comb-like jig 6 (see FIG. 3) in which downward-directed V-like teeth are formed is first inserted into one side of the upper end portion with respect to the center, thereby distributedly collecting edge portions of the negative electrode 1a protruding in the upper end of the power generating element 1, to three places. Next, as shown in FIG. 7, the negative collector 2 is placed on the upper end portion of the power generating element 1, so that the sets of plural edge portions of the negative electrode 1a which have been distributed by the jig 6 are pressingly held in the gaps of the press holds 2c of the collector portion 2a, respectively. In each of the press holds 2c, the part of the one copper plate portion other than the reduced thickness portions 2g and the other copper plate portion are crimped. The crimping work is performed by inserting an attachment of a crimping tool on the both sides of each of the press holds 2c, from the upper side, and then applying a force so as to collapse the two copper plate portions. In each of the press holds 2c, as indicated by the arrow A in FIG. 8, ultrasonic welding is performed between the part of the one copper plate portion other than the reduced thickness portions 2g and the other copper plate portion, and, as indicated by the arrow B of FIG. 8, ultrasonic welding is performed also between the reduced thickness portions 2g of the one copper plate portion and the other copper plate portion. The ultrasonic welding is performed by inserting an attachment of an ultrasonic welder on the both sides of each of the press holds 2c, from the upper side, and then applying ultrasonic vibration to the two copper plate portions. In the part of the one copper plate portion other than the reduced thickness portions 2g and indicated by the arrow A, the two thick copper plate portions are crimped and the edge. portions of the negative electrode 1a between the copper plate portions are welded. Therefore, ultrasonic welding of a high power is performed in the part. In the reduced thickness portions 2g of the one copper plate portion and indicated by the arrow B, the thin copper foils of the edge portions of the negative electrode 1a are directly welded, and hence ultrasonic welding of a restricted power is performed.

In also the positive collector 3 which is not shown in FIG. 7, in the same manner as the negative collector 2, plural edge portions of the positive electrode 1b protruding in the lower end of the power generating element 1 are pressingly held in bundle, in the area from which the aluminum foil is exposed, in each of press holds 3c of the collector portion 3a, and then connected and fixed by crimping and ultrasonic welding the part other than the reduced thickness portions of the one aluminum plate portion, and ultrasonic welding the reduced thickness portions of the one aluminum plate portion.

According to this configuration, the reduced thickness portions 2g are formed in a part of one of the metal plate portions of each of the press holds 2c and 3c of the collector portions 2a and 3a of the negative and positive collectors 2. Therefore, the plural edge portions of the negative and positive electrodes 1a and 1b which are pressingly held by the press holds can be surely welded together so as to be connected and fixed by ultrasonic welding which is directly performed through the reduced thickness portions 2g. Therefore, there is no fear that the cell properties are lowered in accordance with the use of the cell. Furthermore, also the part of one of the metal plate portions of each of the press holds 2c and 3c other than the reduced thickness portions 2g can surely hold the plural edge portions of the negative or positive electrode 1a or 1b by means of crimping and ultrasonic welding.

In the embodiments described above, the power generating element 1 is wound into an elliptic cylindrical shape. The invention may be similarly applied also on a wound type power generating element of another kind. In the case of a cylindrical power generating element, for example, the press holds 2c and 3c of the collector portions 2a and 3a must be formed so as to be curved along the winding of the negative and positive electrodes 1a and 1b.

In the embodiments, description has been made on a non-aqueous electrolyte secondary cell. The invention may be implemented also on a usual cell of another kind. In the embodiments, the negative and positive electrodes 1a and 1b are formed by copper and aluminum plates, respectively. Depending on the kind of the cell, a metal plate of another kind may be used.

In the embodiments, the press holds 2c and 3c of the negative and positive collectors 2 and 3 are crimped and then ultrasonic welded. The invention is not restricted to this method as far as the edge portions of the negative and positive electrodes 1a and 1b can be pressingly held so as to be fixed and connected. For example, laser welding or the like may be used.

As apparent from the above description, according to the cell of the invention, the flat plate portions are formed among the plural press holds of the collector portion of each of the collectors, and hence there is no fear that the portions are pushed into the power generating element and make contact with another electrode to cause a short circuit. This allows the amount of shift in winding of the positive and negative electrodes, to be reduced. As a result, the area to which the active material is applied can be widened so as to increase the cell capacity.

According to the cell of the invention, the window is formed in a part of one of the metal plate portions of each press hold, and hence the plural electrode edge portions which are pressingly held in the press hold can be surely welded together so as to be connected and fixed by welding which is performed through the window. Therefore, there is no fear that the cell properties are lowered in accordance with the use of the cell because of insufficient electrical connection.

According to the cell of the invention, the reduced thickness portion is formed in a part of one of the metal plate portions of each press hold, and hence the plural electrode edge portions which are pressingly held in the press hold can be surely welded together so as to be connected and fixed by welding which is performed through the reduced thickness portion. Therefore, there is no fear that the cell properties are lowered in accordance with the use of the cell because of insufficient electrical connection.

What is claimed is:

1. A cell with collectors, wherein a collector portion of each of the collectors comprises:
   a plurality of press holds in each of which two metal plate portions are projected to be opposed via a gap that opens on a side of a basal portion, by bending back a substantially vertical metal plate at an apex; and
   horizontal flat plate portions which are formed by a flat metal plate portion and through which adjacent ones of said press holds are coupled to each other on the side of the basal portion;
   a winding axis of a wound type power generating element having ends and said collector portions respectively placed on said ends, with respectively directing the basal portions to the ends, said power generating element being configured by winding strips of positive and negative electrodes with a strip separator therebetween being mutually shifted in the winding axis direction; and edge portions of said positive and negative electrodes protruding at the ends of the winding axis of said power generating element and pressingly held in nearest press holds of said collector portions to be connected and fixed.

2. The cell according to claim 1, wherein said edge portions of said positive and negative electrodes are inserted between said two metal plate portions of said corresponding press hold of said collector portions, and then connected and fixed to said two metal plate portions by crimping and ultrasonic welding.

3. The cell according to claim 2, wherein a window is formed in a part of one of said metal plate portions of each of said press holds of said collector portions of said collectors, said window communicating with said gap between said one metal plate portion and said other metal plate portion.

4. The cell according to claim 3, wherein said edge portions of said electrodes are connected and fixed by inserting said edge portions between said two metal plate portions of said corresponding press hold of said collector portions and then crimping said metal plate portions, and also by ultrasonic welding of said window of said one metal plate portion and said other metal plate portion, and a part of said one metal plate portion other than said window and said other metal plate portion.

5. The cell according to claim 1, wherein a window is formed in a part of one of said metal plate portions of each of said press holds of said collector portions of said collectors, said window communicating with said gap between said one metal plate portion and said other metal plate portion.

6. The cell according to claim 3, wherein said edge portions of said electrodes are connected and fixed by inserting said edge portions between said two metal plate portions of said corresponding press hold of said collector portions and then crimping said metal plate portions, and also by ultrasonic welding of said window of said one metal portion and said other metal plate portion, and a part of said other metal plate portion.

7. A cell comprising:

a power generating element in which a plurality of positive and negative electrode plates are wound, each of said plurality of positive and negative plates having an edge portion;

a separator positioned therebetween each of said plurality of plates and said edge portion of one of said electrode plates protrude from said edge portion of another one of said electrode plates; and a plurality of collectors respectively connected to said edge portions, wherein each of said collectors is formed by bending a metal plate to have plural groove portions and horizontal flat plate portions which are used for pressingly holding and bonding said edge portion of either of said electrode plates, and a reduced thickness portion is formed in a part of each of said groove portions.

8. The cell according to claim 7, wherein each of said collectors is formed by a plate member of a thickness of 0.5 to 2 mm and said reduced thickness portion has a thickness which is 10% to 80% of the thickness of said collector.

* * * * *